US012022395B2

United States Patent
Åström et al.

(10) Patent No.: US 12,022,395 B2
(45) Date of Patent: *Jun. 25, 2024

(54) METHOD FOR DETERMINING TIMING OF TRANSMISSION, NETWORK NODE, AND COMPUTER PROGRAM

(71) Applicant: Telefonaktiebolaget LM Ericsson (publ), Stockholm (SE)

(72) Inventors: Magnus Åström, Lund (SE); Andreas Höglund, Solna (SE); Anders Wallén, Ystad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,466

(22) Filed: Nov. 21, 2022

(65) Prior Publication Data
US 2023/0083080 A1    Mar. 16, 2023

Related U.S. Application Data

(63) Continuation of application No. 16/971,056, filed as application No. PCT/EP2019/051628 on Jan. 23, 2019, now Pat. No. 11,540,218.
(Continued)

(51) Int. Cl.
*H04W 52/02* (2009.01)
*H04W 4/70* (2018.01)
(Continued)

(52) U.S. Cl.
CPC ... *H04W 52/0235* (2013.01); *H04W 52/0254* (2013.01); *H04W 68/02* (2013.01)

(58) Field of Classification Search
None
See application file for complete search history.

(56) References Cited

U.S. PATENT DOCUMENTS 10,051,601 B2 * 8/2018 Ang ................. H04W 68/00
11,540,218 B2 * 12/2022 Åström ............ H04W 52/0229
(Continued)

OTHER PUBLICATIONS

International Search Report and Written Opinion dated Mar. 19, 2019 for International Application No. PCT/EP2019/051628 filed on Jan. 23, 2020, consisting of 11-pages.
(Continued)

*Primary Examiner* — Inder P Mehra
(74) *Attorney, Agent, or Firm* — Weisberg I.P. Law, P.A.

(57) ABSTRACT

A network node is arranged to operate in a cell of a cellular communication system. The network node comprises an interface towards the cellular communication system where the interface is arranged to receive paging information for an idle user equipment, UE, a paging handler arranged to determine a mode of power saving for the UE, and to determine timing for a wake-up signal based on the determined mode and the received paging information, and a transmitter arranged to transmit the wake-up signal at the determined timing. A method of the network node comprises receiving paging information for an idle user equipment, UE, from the cellular communication system, determining a mode of power saving for the UE, determining timing for a wake-up signal based on the determined mode and the received paging information, and transmitting the wake-up signal at the determined timing.

21 Claims, 3 Drawing Sheets

Related U.S. Application Data

(60) Provisional application No. 62/635,096, filed on Feb. 26, 2018.

(51) Int. Cl.
| | | |
|---|---|---|
| *H04W 28/02* | (2009.01) | |
| *H04W 68/00* | (2009.01) | |
| *H04W 68/02* | (2009.01) | |
| *H04W 76/28* | (2018.01) | |

(56) References Cited

U.S. PATENT DOCUMENTS

| | | | |
|---|---|---|---|
| 2007/0105568 A1* | 5/2007 | Nylander | H04W 36/10 455/458 |
| 2008/0004044 A1* | 1/2008 | Simpson | H04W 52/0216 455/458 |
| 2009/0034459 A1* | 2/2009 | Shousterman | H04W 72/0446 370/329 |
| 2013/0176873 A1* | 7/2013 | Ji | H04W 76/28 455/67.11 |
| 2014/0176115 A1 | 6/2014 | Pflum et al. | |
| 2017/0127469 A1* | 5/2017 | Chen | H04W 4/12 |
| 2021/0112495 A1* | 4/2021 | Liang | H04W 52/0235 |
| 2021/0212153 A1 | 7/2021 | Siomina et al. | |

OTHER PUBLICATIONS

3GPP TSG-RAN WG1 Meeting #92 R1-1801489; Title: Wake-up signal configurations and procedures for NB-IoT; Agenda Item: 6.2.6.1.1.2; Source: Ericsson; Document for: Discussion and Decision; Date and Location: Feb. 26-Mar. 2, 2018, Athens, Greece, consisting of 9-pages.

3GPP TSG-RAN WG2 #99bis R2-1710749; Title: Wake-up signal for NB-IoT and eMTC; Agenda Item: 9.14.9; Source: Ericsson; Document for: Discussion, Decision; Date and Location: Oct. 9-13, 2017, Prague, Czech Republic, consisting of 8-pages.

3GPP TSG-RAN WG2 #100 R2-1713033; Title: Wake-up signal for NB-IoT and eMTC; Agenda Item: 9.13.9; Source: Ericsson; Document for: Discussion, Decision; Date and Location: Nov. 27-Dec. 1, 2017, Reno, NV, USA, consisting of 9-pages.

* cited by examiner

METHOD FOR DETERMINING TIMING OF TRANSMISSION, NETWORK NODE, AND COMPUTER PROGRAM

CROSS REFERENCE TO RELATED APPLICATIONS

This application is a Continuation of U.S. application Ser. No. 16/971,056, filed Aug. 19, 2020, which is a National Stage Application of International Application No. PCT/EP2019/051628, filed Jan. 23, 2019, which claims priority to U.S. Provisional Application No. 62/635,096, filed Feb. 26, 2018, the entireties of all of which are incorporated herein by reference.

TECHNICAL FIELD

The present disclosure generally relates to a network node, a method therefor, and a computer program for implementing the method in the network node. In particular, the present disclosure relates to determining timing of transmission of a wake-up signal.

BACKGROUND

In legacy $3^{rd}$ Generation Partnership Project (3GPP) specified Radio Access Technologies such as Long Term Evolution, a mobile terminal or User Equipment (UE) is either in a Radio Resource Control (RRC) connected mode where it continuously monitors if it is scheduled, or an idle mode where it periodically monitors a paging channel. The periodical monitoring is referred to as Discontinuous Reception (DRX). In LTE, there is provided DRX and an extended DRX (eDRX) which provides longer cycles of putting UE receiver in off-mode. These approaches enable for considerable energy savings in the UE.

Machine Type Communication (MTC) is expected to be an increasing application of cellular systems as those demonstrated above and future systems such as the one commonly referred to as 5G (from "$5^{th}$ Generation"). Here, further energy saving in idle mode is desired, which may enable very long operation of a UE without charging or battery change, up to several years. Such long operation times assume infrequent communication and very low energy consumption between the communication occasions. One approach is to only let the UE wake up when it intends to send something. However, communication may be desired to be initiated from network side. Thus, the UE still needs to monitor paging signals. It is therefore desired to provide approaches for further energy reduction in idle modes compared with for example only applying DRX and eDRX.

The above information disclosed in this Background section is only for enhancement of understanding of the background of the disclosure and therefore it may contain information that does not form the prior art that is already known to a person of ordinary skill in the art.

SUMMARY

The disclosure is based on the inventors' understanding that provision of wake-up signals can further enhance power saving during paging reception.

According to a first aspect, there is provided a network node arranged to operate in a cell of a cellular communication system. The network node comprises an interface towards the cellular communication system where the interface is arranged to receive paging information for an idle UE, a paging handler arranged to determine a mode of power saving for the UE, and to determine timing for a wake-up signal based on the determined mode and the received paging information, and a transmitter arranged to transmit the wake-up signal at the determined timing.

The cellular communication system may be 3GPP LTE and the mode of power saving may be any one of Discontinuous Reception, DRX, and extended Discontinuous Reception, eDRX, and the paging handler may be arranged to determine the timing for the wake-up signal based on a paging transmission window for the UE and a paging occasion within the paging transmission window based on whether the UE operates in DRX mode or eDRX mode. The paging handler may be arranged to determine the time for transmitting the wake-up signal to be ahead of an $m^{th}$ paging occasion, where m is any of M paging occasions per wake-up signal transmission when the UE operates in the DRX mode, and to determine the time for transmitting the wake-up signal to be ahead of a $(kN+1)^{th}$ paging occasion, where k is 0, 1, 2, ..., and N is number of paging occasions per wake-up signal transmission when the UE operates in the eDRX mode.

The mode of power saving may be any one of a first discontinuous reception mode, a second discontinuous reception mode having a longer cycle than the first discontinuous reception mode, and a power saving mode without any cycle and which is only monitoring the wake-up signal, and the paging handler may be arranged to, when operating in the first or second discontinuous reception modes, determine the timing for the wake-up signal based on a paging transmission window for the UE and a paging occasion within the paging transmission window based on whether the UE operates in first or second discontinuous reception modes, and the timing for the wake-up signal may be determined to be at a first instance when the UE operates in the power saving mode without any cycle.

The paging handler may have a mobility estimate of the UE and may be arranged to determine the timing for the wake-up signal according to a first scheme for a first mobility state, and according to a second scheme for a second mobility state. The first mobility state may comprise that the UE is expected to have remaining reception performance of signal transmissions from the network node, and the second mobility state may comprise that the UE is likely to have changing reception performance of signal transmissions from the network node.

The cellular communication system may be 3GPP LTE and the mode of power saving may be any one of Discontinuous Reception, DRX, and extended Discontinuous Reception, eDRX, and the paging handler may be arranged to determine the timing for the wake-up signal based on whether the UE is configured with DRX mode or eDRX mode. The timing based on whether the UE is configured with DRX mode or eDRX mode may be such that a time between the WUS and a related paging occasion is different for the operation modes, i.e. different for DRX and eDRX. The time for eDRX mode may be longer than the time for DRX. The time may be ahead of a paging occasion for DRX and may be ahead of a paging occasion in a paging transmission window for eDRX. The determination of the timing may comprise determination of a time for the UE to wake up from its operation mode.

According to a second aspect, there is provided a method of a network node, where the network node is arranged to operate in a cell of a cellular communication system. The method comprises receiving paging information for an idle user equipment, UE, from the cellular communication system, determining a mode of power saving for the UE, determining timing for a wake-up signal based on the determined mode and the received paging information, and transmitting the wake-up signal at the determined timing.

The cellular communication system may be 3GPP LTE and the mode of power saving may be any one of Discontinuous Reception, DRX, and extended Discontinuous Reception, eDRX, and the determining of the timing for the wake-up signal may be based on a paging transmission window for the UE and a paging occasion within the paging transmission window, and based on whether the UE operates in DRX mode or eDRX mode. The determining of the timing for the transmitting of the wake-up signal may be determined to be ahead of an $m^{th}$ paging occasion, where m is any of M paging occasions per wake-up signal transmission when the UE operates in the DRX mode, and the determining of the timing for transmitting the wake-up signal to be ahead of a $(kN+1)^{th}$ paging occasion, where k is 0, 1, 2, . . . , and N is number of paging occasions per wake-up signal transmission when the UE operates in the eDRX mode.

The mode of power saving may be any one of a first discontinuous reception mode, a second discontinuous reception mode having a longer cycle than the first discontinuous reception mode, and a power saving mode without any cycle and which is only monitoring the wake-up signal, and the method may comprise determining, when operating in the first or second discontinuous reception modes, the timing for the wake-up signal based on a paging transmission window for the UE and a paging occasion within the paging transmission window based on whether the UE operates in first or second discontinuous reception modes, and determining, when the UE operates in the power saving mode without any cycle, the timing for the wake-up signal to be at a first instance.

The network node may have a mobility estimate of the UE, and the determining of the timing for the wake-up signal may be performed according to a first scheme for a first mobility state, and according to a second scheme for a second mobility state. The first mobility state may comprise that the UE is expected to have remaining reception performance of signal transmissions from the network node, and the second mobility state may comprise that the UE is likely to have changing reception performance of signal transmissions from the network node.

The cellular communication system may be 3GPP LTE and the mode of power saving may be any one of Discontinuous Reception, DRX, and extended Discontinuous Reception, eDRX, and the determining of the timing may include determining the timing for the wake-up signal based on whether the UE is configured with DRX mode or eDRX mode. The timing based on whether the UE is configured with DRX mode or eDRX mode may be such that a time between the WUS and a related paging occasion is different for the operation modes. The time for eDRX mode may be longer than the time for DRX. The time may be ahead of a paging occasion for DRX and may be ahead of a paging occasion in a paging transmission window for eDRX. The determination of the timing may comprise determining a time for the UE to wake up from its operation mode.

According to a third aspect, there is provided a computer program comprising instructions which, when executed on a processor of a network node, causes the network node to perform the method according to the second aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

This disclosure aims at providing approaches for keeping energy consumption low in idle modes. One way is to have a wake-up receiver in the UE which is arranged to operate with very low energy consumption. The wake-up receiver may be a separate receiver or a dedicated operation mode of the ordinary receiver of the UE, wherein when the wake-up receiver detects a wake-up signal from the network, it provides a control signal to the ordinary receiver to start receiving, i.e. it starts the ordinary receiver for the case where a separate wake-up receiver is provided, or changes mode from the low-power mode to ordinary mode of the ordinary receiver for the case where the dedicated operation mode of the ordinary receiver is provided.

This disclosure assumes application of a wake-up receiver approach where a network node is assumed to provide a wake-up signal to a UE operating in a low-power idle mode. The inventors' contribution is in particular an efficient way to schedule provision of the wake-up signal in view of paging activities. Paging and discontinuous reception is described in for example 3GPP TS 36.304, V14.5.0, chapter 7, which is incorporated in its entirety by reference, and is not further described here. Furthermore, sleep modes for 5G are described in Lauridsen et al, "Sleep Modes for Enhanced Battery Life of 5G Mobile Terminals", IEEE 2016, which is incorporated in its entirety by reference.

Figure 1:
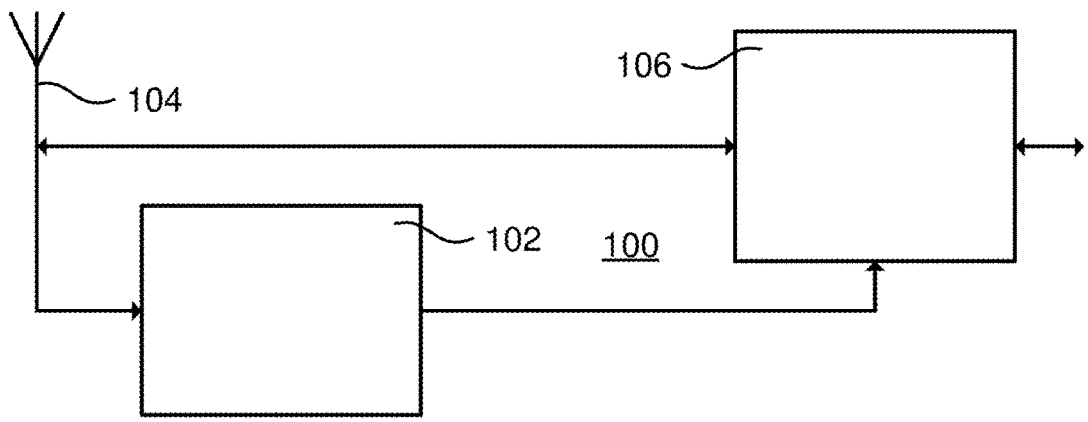
FIG. 1 schematically illustrates a wake-up receiver configuration where a separate wake-up receiver is provided.

FIG. 1 schematically illustrates a wake-up receiver configuration 100 where a separate wake-up receiver 102 is provided. An antenna arrangement 104 receives radio signals where the wake-up receiver 102 picks up a wake-up signal when present, and upon proper detection the wake-up receiver 102 provides a control signal to a main transceiver 106, supposedly being off, which then wakes up and starts normal operations.

Figure 2:
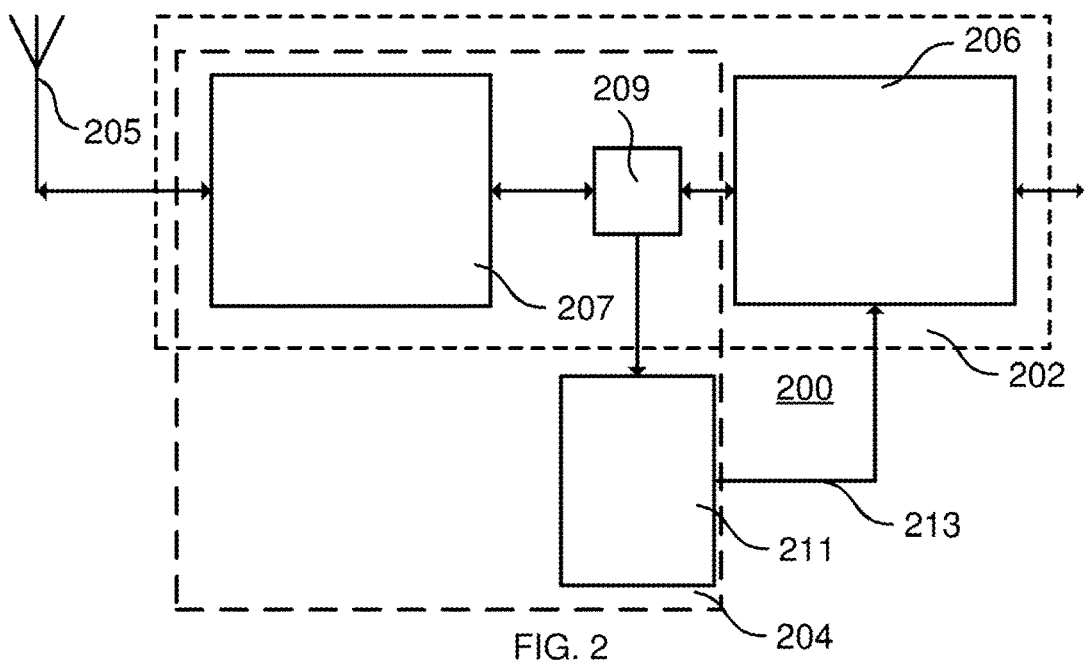
FIG. 2 schematically illustrates a wake-up receiver configuration where many parts of a main receiver and a wake-up receiver are in common.

FIG. 2 schematically illustrates a wake-up receiver configuration 200 where many parts of a main receiver 202 and a wake-up receiver 204 are in common. It can also be seen as the wake-up receiver operation is a low-power state of the main receiver where some energy-consuming parts 206 are hibernated and upon proper detection of a wake-up signal is made, the main receiver 202 wakes those parts 206 up and enters a normal state where the main receiver 202 is enabled to decode e.g. paging signals. For example, the common parts may comprise antenna 205 and front-end electronics 207 such as low-noise amplifier, filter, duplexer, etc. A signal splitter 209 may be provided to tap a signal to a low-power detector 211 of the wake-up receiver 204, which provides a control signal 213 to wake up the energy-consuming parts 206 of the main receiver 202 upon detection of a proper wake-up signal.

The disclosure provides a method to schedule wake-up signals to UEs with different modes of operation regarding relation between wake-up signals (WUS) and paging occasions (PO), e.g. WUS-to-PO ratio, according to respective UE's individual ratio. In particular, the ratios will differ between DRX and eDRX modes. Here, the trivial 1-to-1 ratio is not considered by the disclosure, which relates to non-1-to-1 ratios, e.g. 1-to-N ratio used for eDRX, where N is an integer and N>1.

The disclosure provides a method in a network node (e.g. eNB, gNB) for transmitting a WUS, related to a paging message, to a wireless device (UE). The UE may for example belong to one of two sleep modes, DRX or eDRX, that has different WUS-to-PO ratios. As such, the method starts by the eNB receiving a paging message from a Mobility Management Entity (MME). From that paging message, it is possible for the network node to determine whether the UE is in e.g. DRX or eDRX, which for example may be made by reading the paging eDRX information. The network node also knows the WUS-to-PO ratio of UEs in both DRX and eDRX. From this information, the network node may determine a suitable WUS timing in relation to the PO in which the paging message is scheduled to be transmitted. Finally, the network node transmits the WUS at the determined timing.

For some idle modes of the UE, there is no cyclic reception. This may be where the UE only monitors WUS and only makes receptions of other signals, e.g. paging, after detecting a proper WUS. This may be the case where the UE is in a very low-power idle mode but still is expected to react on time-critical operations as soon as a WUS is detected. In such cases the network node schedules the WUS at a first reasonable instant.

For any of the above discussed variants, the UE may be enabled to save significant amounts of energy by only receiving the more complex (compared with the WUS) paging signal after detection of a proper WUS.

An advantage is that it will be possible to schedule for example DRX and eDRX UEs with different WUS-to-PO ratios. Therefore, more flexible scheduling is allowed and UEs with more varying requirements may be served by the network resulting in improved UE power efficiency.

An advantage is that UEs may achieve better idle mode operation, e.g. where using DRX and eDRX, thereby improving the sleep mode performance, and in the end power consumption. Such functionality is paramount in achieving for example several years device longevity in a battery-operated UE.

The suggested approach will first be given by specific examples for making understanding of the broader principles demonstrated later easier to understand. Consider for example a cellular communication system where a first energy saving idle mode and a second energy saving idle mode are provided for UEs, e.g. LTE where DRX and eDRX are provided. Some UEs may be operating in DRX mode and others may be operating in eDRX mode, and/or in DRX or eDRX mode but with different DRX or eDRX configurations. Consider then UEs in DRX and eDRX where the DRX and eDRX configurations differ such that a UE operating in DRX mode is configured with a WUS-to-PO relation of 1-to-M, i.e. one WUS transmission per M POs, implying the UE may be configured to search for a WUS only every M POs. Similarly, an UE operating in eDRX mode is configured with a 1-to-N WUS-to-PO relation, i.e. one WUS transmission per N POs implying the UE may be configured to search for a WUS only every N POs within a Paging Transmission Window (PTW). By having these configurations, the UE can wake up less often also with regards to the wake-up receiver, and thereby preserve power and improve longevity.

In one embodiment, in case a UE is operating in eDRX mode, and the UE is configured with a 1-to-N configuration, i.e. WUS-to-PO relation, the WUS timing is determined to be ahead of the $(kN+1)^{th}$ PO in the PTW, where k=[0, 1, . . . ], i.e., ahead of the $1^{st}$ PO, $(N+1)^{st}$ PO, and so on such that the UE is able to wake up and receive the paging when detecting the WUS. "Ahead" should in this context mean to give ample time for the UE to wake up. Typically, the time to wake up from eDRX mode takes longer than to wake up from DRX. Therefore, the timing of the wake-up signal transmission in relation to the PO may be different between operating modes of the UE. In a related embodiment, the WUS timing may further be scheduled at a plurality (up to N−1) of POs ahead of the PO in which the paging message is scheduled to safeguard that the WUS is properly detected and the UE is able to wake up before the PO.

In another embodiment, when the UE is operating in DRX mode, in which case a UE may be configured with a 1-to-M configuration, the WUS timing is determined to be ahead of the $m^{th}$ PO out of M POs that corresponds to the PO for which the UE is instructed to read WUS. This $m^{th}$ PO, (m={1, . . . , M}) may be identified by the UE's IMSI number or by explicit signalling. In another embodiment, the timing is related to the PO location in a paging or system frame or hyperframe. Furthermore, in the DRX mode case, the WUS timing is determined at a plurality (up to M−1) of POs ahead of the PO being allocated for the paging message to safeguard proper detection of the WUS.

That is, a UE configured with eDRX will, when a proper WUS is received, prepare for receiving paging and will read paging signals at POs during a paging transmission window, but may apply power saving actions, which may resemble those of traditional DRX, between the POs of the paging transmission window. Similar, a UE configured with DRX will, when a proper WUS is received, prepare for receiving paging and will read paging signals at a coming PO. The paging transmission window length may be configurable.

It may be noted that eDRX is typically UE-specific and a mobility management entity, MME, saves configurations for respective UE when the UE enters idle mode, while DRX is typically cell-specific where UEs of a cell are handled using same parameters, except for cases where DRX is configured for shortened periodicity where the DRX also may be UE-specific.

In a further embodiment, the mobility situation of the UE may also be considered. This can be done with one of the DRX or eDRX modes, or for both modes. The UE may determine that its reception performance is unchanged, and/or it remains in the same cell, and hence is stationary or semi-stationary. According to that determination, the UE may then attempt to detect WUS according to a first configuration, e.g., only considering a first WUS location. If the determination is instead that the UE is mobile, the UE may attempt to detect WUS according to a second configuration, e.g., prior to all subsequent POs. Thresholds for determinations whether the UE is (semi-)stationary or mobile should be chosen with considerations between proper detection and sufficient energy saving.

Figure 3:
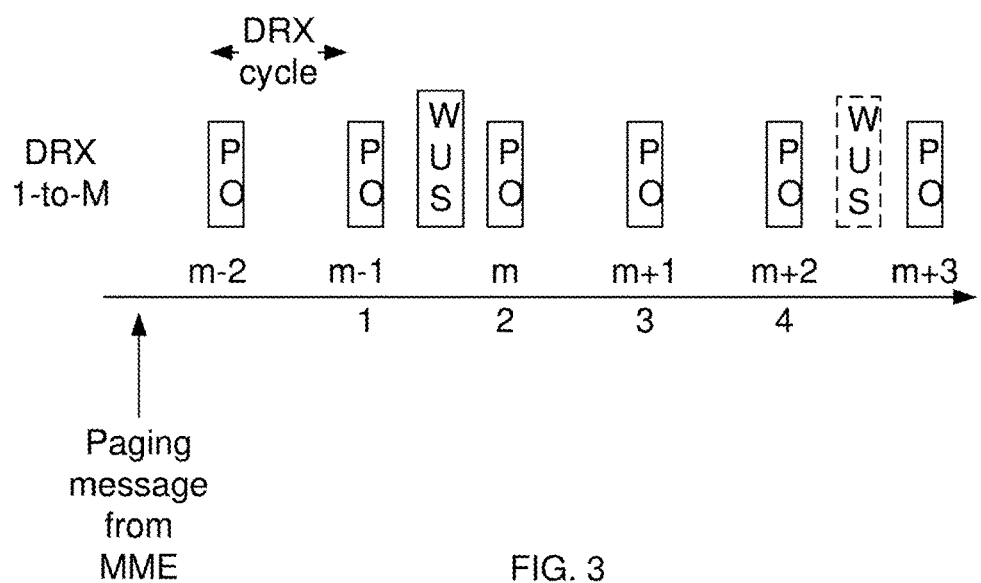
FIG. 3 is a signal diagram schematically illustrating timing of a wake-up signal in relation to POs and DRX cycle according to an example.

FIG. 3 is a signal diagram schematically illustrating timing of a wake-up signal in relation to POs and DRX cycle according to an example.

Figure 4:
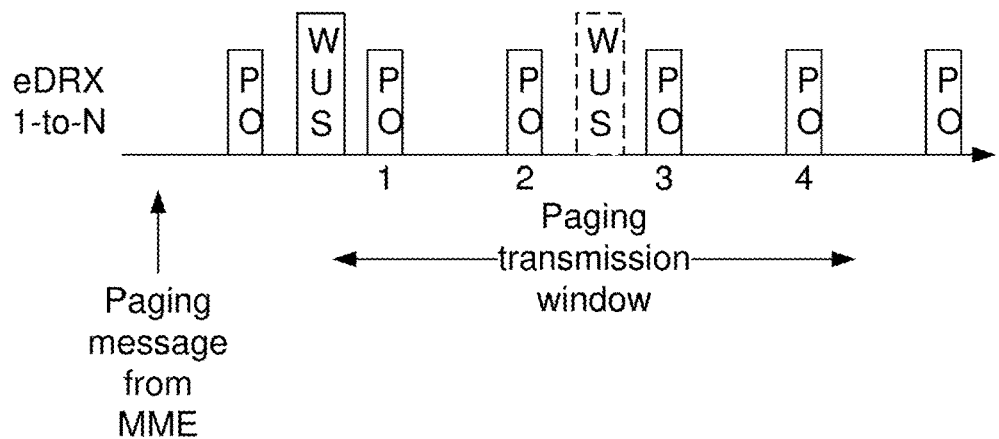
FIG. 4 is a signal diagram schematically illustrating timing of a wake-up signal in relation to POs and eDRX cycle according to an example.

FIG. 4 is a signal diagram schematically illustrating timing of a wake-up signal in relation to POs and eDRX cycle according to an example.

Figure 5:
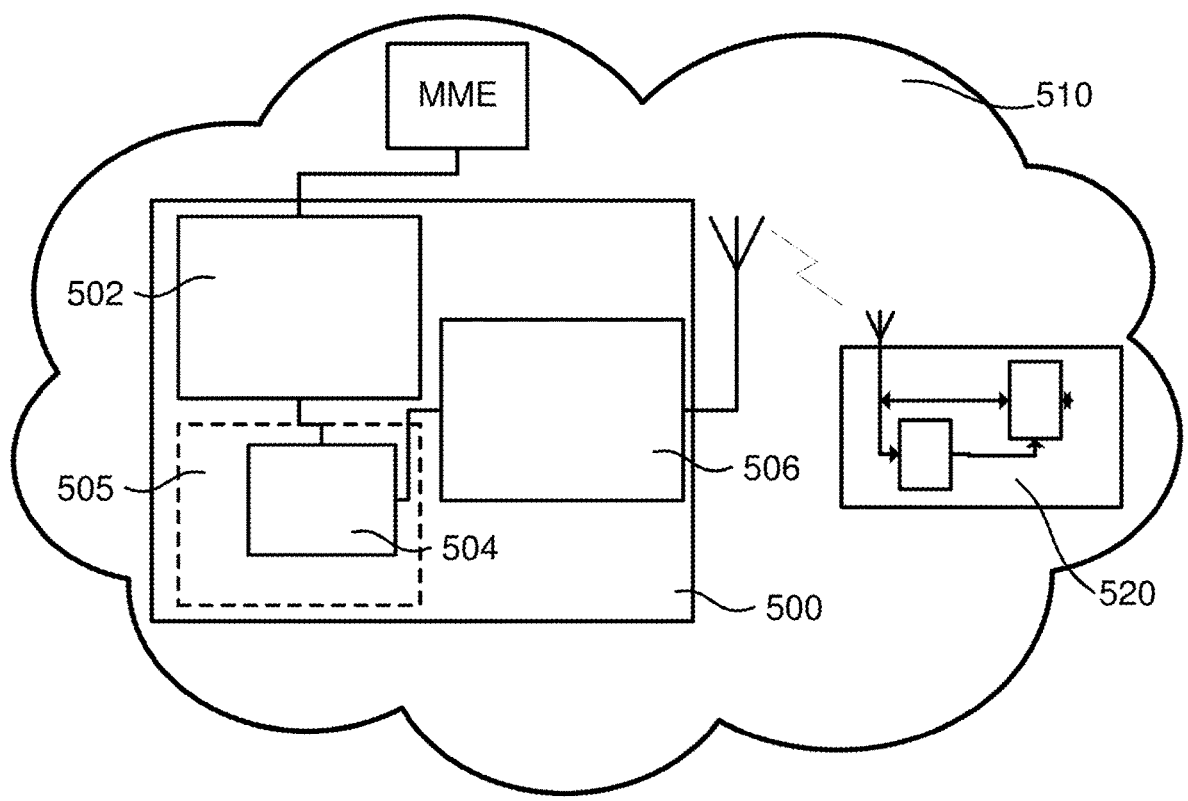
FIG. 5 is a block diagram schematically illustrating a network node according to an embodiment.

FIG. 5 is a block diagram schematically illustrating a network node 500 according to an embodiment arranged to operate in a cell of a cellular communication system 510. The network node 500 comprises an interface 502 towards the cellular communication system 510, e.g. towards a mobility management entity. The interface 502 is arranged to receive paging information for an idle UE 520. The network node 500 further comprises a paging handler 504 arranged to determine a mode of power saving for the UE 520, and to determine timing for a wake-up signal based on the determined mode and the received paging information. The network node 500 further comprises a transmitter 506 arranged to transmit the wake-up signal at the determined timing.

The interface 502 can be a signal interface, e.g. electrical or optical.

The paging handler 504 is arranged to determine the timing as demonstrated above. The paging handler 504 may be implemented in a processing element 505, e.g. a signal processor, of the network node 500. The processing element 505 may comprise one or more circuits. The processing element 505 can also fulfil a multitude of tasks, ranging from signal processing to enable reception and transmission since it is connected to the transmitter 506, executing applications, controlling the interface 502, etc.

Figure 6:
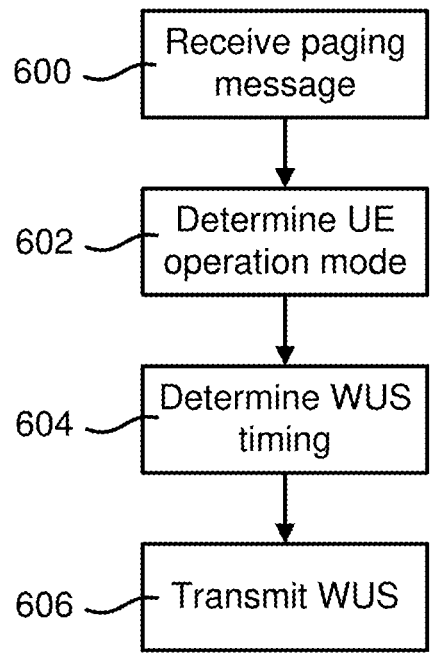
FIG. 6 is a flow chart illustrating a method according to an embodiment.

FIG. 6 is a flow chart illustrating methods according to embodiments. The method is performed by a network node, where the network node is arranged to operate in a cell of a cellular communication system, as demonstrated above. The method comprises receiving 600 paging information for an idle UE from the cellular communication system. A mode of power saving for the UE is determined 602. A timing for a wake-up signal is determined 604 based on the determined mode and the received paging information. The wake-up signal is then transmitted 606 at the determined timing.

For example, the cellular communication system is 3GPP LTE and the mode of power saving is any one of DRX and eDRX, and the determining 604 of the timing for the wake-up signal is based on a paging transmission window for the UE and a paging occasion within the paging transmission window, and based on whether the UE operates in DRX mode or eDRX mode. The determining 604 of the timing for the transmitting 606 of the wake-up signal may be determined to be ahead of an $m^{th}$ paging occasion, where m is any of M paging occasions per wake-up signal transmission when the UE operates in the DRX mode, and the determining 604 of the timing for transmitting the wake-up signal to be ahead of a $(kN+1)^{th}$ paging occasion, where k is 0, 1, 2, . . . , and N is number of paging occasions per wake-up signal transmission when the UE operates in the eDRX mode.

There may be further power saving modes available for the UE. According to one example, there may be non-cyclic power saving modes. For example, the mode of power saving is any one of a first discontinuous reception mode, a second discontinuous reception mode having a longer cycle than the first discontinuous reception mode, and a power saving mode without any cycle and which is only monitoring the wake-up signal. The non-cyclic mode may have a purpose of handling time-critical events and/or constitute a very low-energy-consuming mode. The method may for this example comprises determining 604, when operating in the first or second discontinuous reception modes, the timing for the wake-up signal based on a paging transmission window for the UE and a paging occasion within the paging transmission window based on whether the UE operates in first or second discontinuous reception modes, similar as demonstrated above, and determining 604, when the UE operates in the power saving mode without any cycle, the timing for the wake-up signal to be at a first reasonable instance, i.e. the network node schedules the wake-up signal at first possible or a selected time based on the operation.

The network node may have a mobility estimate of the UE, similar to the UE determining its mobility state as demonstrated above, and the determining 604 of the timing for the wake-up signal may be performed according to a first scheme for a first mobility state, and according to a second scheme for a second mobility state. For example, the first mobility state may comprise that the UE is expected to have remaining reception performance of signal transmissions from the network node, and the second mobility state may comprise that the UE is likely to have changing reception performance of signal transmissions from the network node.

Figure 7:
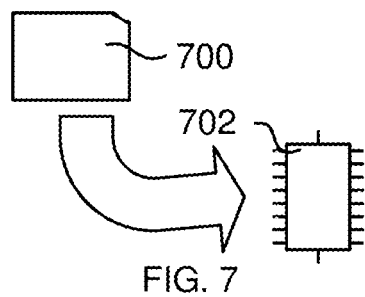
FIG. 7 schematically illustrates a computer-readable medium and a processing device.

The methods according to the present disclosure are suitable for implementation with aid of processing means, such as computers and/or processors, especially for the case where the processing element 505 demonstrated above comprises a processor handling determination 602, 604 of power saving mode and timing of the wake-up signal. Therefore, there is provided computer programs, comprising instructions arranged to cause the processing means, processor, or computer to perform the steps of any of the methods according to any of the embodiments described with reference to FIG. 6. The computer programs preferably comprise program code which is stored on a computer readable medium 700, as illustrated in FIG. 7, which can be loaded and executed by a processing means, processor, or computer 702 to cause it to perform the methods, respectively, according to embodiments of the present disclosure, preferably as any of the embodiments described with reference to FIG. 6. The computer 702 and computer program product 700 can be arranged to execute the program code sequentially where actions of the any of the methods are performed stepwise, or according to a real-time scheme. The processing means, processor, or computer 702 is preferably what normally is referred to as an embedded system. Thus, the depicted computer readable medium 700 and computer 702 in FIG. 7 should be construed to be for illustrative purposes only to provide understanding of the principle, and not to be construed as any direct illustration of the elements.

The invention claimed is:

1. A network node configured to operate in a cell of a cellular communication system, the network node comprising:

an interface towards the cellular communication system, the interface being configured to receive paging information for an idle user equipment, UE;

a paging handler configured to:
  determine a mode of power saving for the UE, the mode of power saving being any one of a first discontinuous reception mode, a second discontinuous reception mode having a longer cycle than the first discontinuous reception mode, and a power saving mode without any cycle and which is only monitoring a wake-up signal, WUS; and
  determine timing for the WUS based on the determined mode of power saving for the UE, the received paging information, a paging transmission window for the UE, and a paging occasion within the paging transmission window; and a transmitter configured to transmit the WUS at the determined timing.

2. The network node of claim 1, wherein the first discontinuous reception mode is a Discontinuous Reception, DRX, mode, the second discontinuous reception mode is an extended Discontinuous Reception, eDRX, mode.

3. The network node of claim 2, wherein the timing for the WUS is such that a time between the WUS and a related paging occasion is different for the DRX and eDRX modes.

4. The network node of claim 3, wherein the time for the eDRX mode is longer than the time for the DRX mode.

5. The network node of claim 3, wherein the time is ahead of one paging occasion for the DRX mode and is ahead of another paging occasion in one paging transmission window for the eDRX mode.

6. The network node of claim 2, wherein the determination of the timing comprises determination of a time for the UE to wake up from the mode of power saving.

7. The network node of claim 2, wherein the paging handler is configured to determine the timing for transmitting the WUS to be ahead of an $m^{th}$ paging occasion, where m is any of M paging occasions per WUS transmission when the UE operates in the DRX mode, and to determine the time for transmitting the WUS to be ahead of a $(kN+1)^{th}$ paging occasion, where k is 0, 1, 2, . . . , and N is number of paging occasions per WUS transmission when the UE operates in the eDRX mode.

8. The network node of claim 1, wherein the paging handler is configured to, when operating in the first or second discontinuous reception modes, determine the timing for the WUS further based on whether the UE operates in first or second discontinuous reception modes, and the timing for the WUS is determined to be at a first instance when the UE operates in the power saving mode without any cycle.

9. The network node of claim 1, wherein the paging handler has a mobility estimate of the UE and is configured to determine the timing for the WUS according to a first scheme for a first mobility state, and according to a second scheme for a second mobility state.

10. The network node of claim 9, wherein the first mobility state comprises that the UE is expected to have remaining reception performance of signal transmissions from the network node, and the second mobility state comprises that the UE is likely to have changing reception performance of signal transmissions from the network node.

11. A method of a network node, the network node being configured to operate in a cell of a cellular communication system, the method comprising:

receiving paging information for an idle user equipment, UE, from the cellular communication system;

determining a mode of power saving for the UE, the mode of power saving being any one of a first discontinuous reception mode, a second discontinuous reception mode having a longer cycle than the first discontinuous reception mode, and a power saving mode without any cycle and which is only monitoring a wake-up signal, WUS;

determining timing for the WUS based on the determined mode of power saving for the UE, the received paging information, a paging transmission window for the UE, and a paging occasion within the paging transmission window; and transmitting the WUS at the determined timing.

12. The method of claim 11, wherein the first discontinuous reception mode is a Discontinuous Reception, DRX, mode, the second discontinuous reception mode is an extended Discontinuous Reception, eDRX.

13. The method of claim 12, wherein the determining of the timing for the transmitting of the WUS is determined to be ahead of an $m^{th}$ paging occasion, where m is any of M paging occasions per WUS transmission when the UE operates in the DRX mode, and the determining of the timing for transmitting the WUS to be ahead of a $(kN+1)^{th}$ paging occasion, where k is 0, 1, 2, . . . , and N is number of paging occasions per WUS signal transmission when the UE operates in the eDRX mode.

14. The method of claim 12, wherein the timing for the WUS is such that a time between the WUS and a related paging occasion is different for the DRX and eDRX modes.

15. The method of claim 14, wherein the time for the eDRX mode is longer than the time for the DRX mode.

16. The method of claim 14, wherein the time is ahead of one paging occasion for the DRX mode and is ahead of another paging occasion in one paging transmission window for the eDRX mode.

17. The method of claim 12, wherein the determination of the timing comprises determining a time for the UE to wake up from the mode of power saving.

18. The method of claim 11, further comprising:
determining, when operating in the first or second discontinuous reception modes, the timing for the WUS further based on whether the UE operates in first or second discontinuous reception modes, and
determining, when the UE operates in the power saving mode without any cycle, the timing for the WUS to be at a first instance.

19. The method of claim 11, wherein the network node has a mobility estimate of the UE, and the determining of the timing for the WUS is performed according to a first scheme for a first mobility state, and according to a second scheme for a second mobility state.

20. The method of claim 19, wherein the first mobility state comprises that the UE is expected to have remaining reception performance of signal transmissions from the network node, and the second mobility state comprises that the UE is likely to have changing reception performance of signal transmissions from the network node.

21. A computer storage medium storing a computer program comprising instructions which, when executed on a processor of a network node, causes the network node to perform a method of a network node, the network node being configured to operate in a cell of a cellular communication system, the method comprising:

receiving paging information for an idle user equipment, UE, from the cellular communication system;

determining a mode of power saving for the UE, the mode of power saving being any one of a first discontinuous reception mode, a second discontinuous reception mode having a longer cycle than the first discontinuous reception mode, and a power saving mode without any cycle and which is only monitoring a wake-up signal, WUS;

determining timing for the WUS based on the determined mode of power saving for the UE, the received paging information, a paging transmission window for the UE, and a paging occasion within the paging transmission window; and transmitting the WUS at the determined timing.

* * * * *